March 15, 1932.  J. R. DEMPSTER  1,849,058
CIRCULAR SLIDE RULE
Filed April 30, 1928
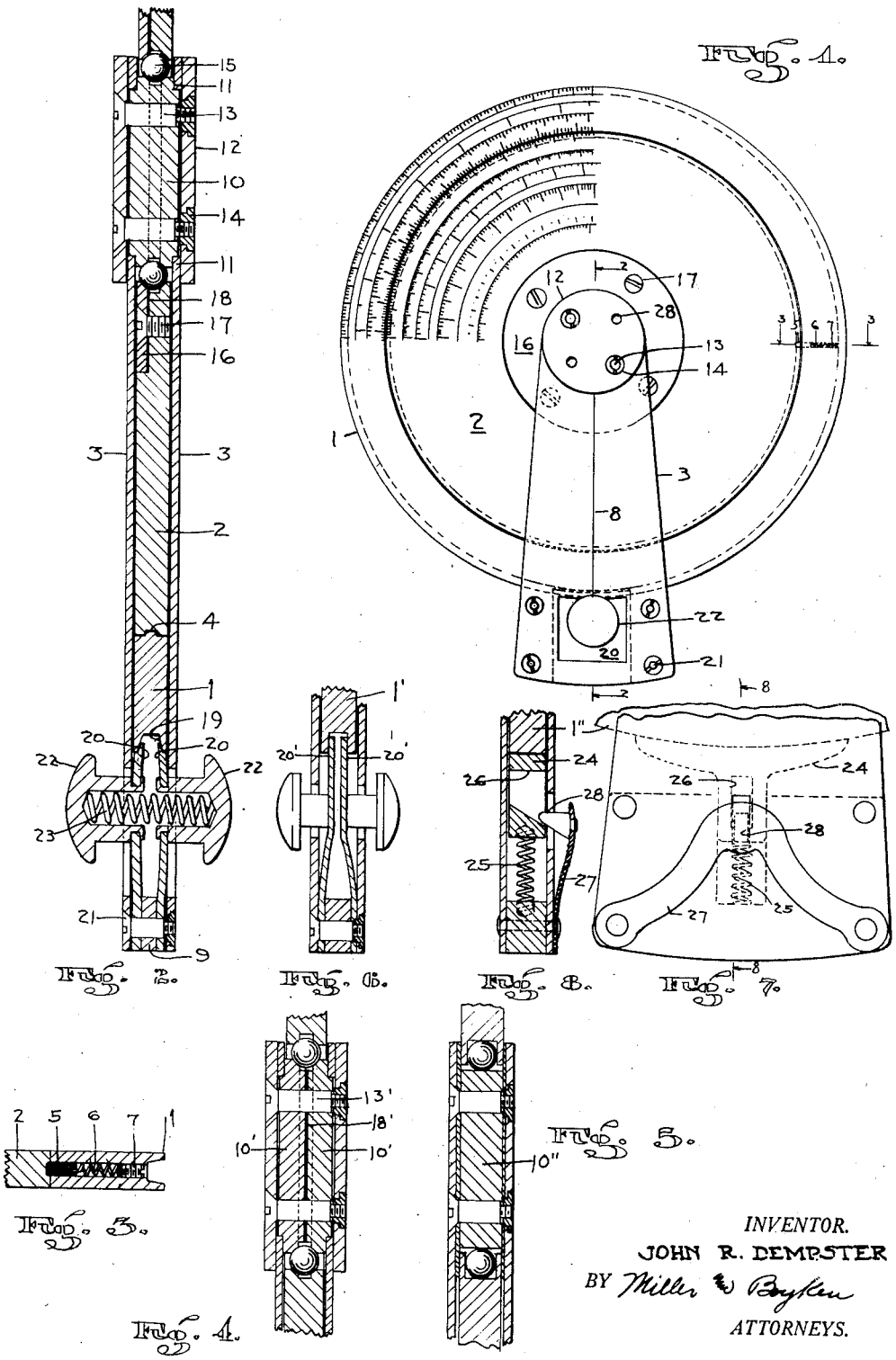
INVENTOR.
JOHN R. DEMPSTER
BY Miller & Boyken
ATTORNEYS.

Patented Mar. 15, 1932

1,849,058

UNITED STATES PATENT OFFICE

JOHN R. DEMPSTER, OF BERKELEY, CALIFORNIA

CIRCULAR SLIDE RULE

Application filed April 30, 1928. Serial No. 273,795.

This invention relates to circular slide rules and has for its objects features of construction whereby the operation of the device is facilitated and is more reliable, and a construction which may be economically manufactured.

In the drawings accompanying this specification Fig. 1 is a plan view of my improved circular slide rule. The scales being omitted as not forming part of the invention.

Fig. 2 is an enlarged cross-section taken along the line 2—2 of Fig. 1.

Fig. 3 is an enlarged cross-section taken along the line 3—3 of Fig. 1.

Figs. 4 and 5 show modifications in the construction of the central bearing.

Figs. 6 and 7 show modifications in construction of the runner brake.

Fig. 8 is a cross-section of Fig. 7 along the line 8—8 thereof.

In the construction of my circular slide rule I provide a disk comprising an outer ring 1 revolvable around an inner ring or disk 2 from the center of which a runner 3 is pivotally supported so as to be revolvable around the rings to any position. The rings comprising the disk are to be suitably graduated on one or both sides according to any mathematical system desired for reading against the runner all as well known in the art, and as partially indicated in Fig. 1.

It is contemplated that the rings may be of metal or of non-metallic material such as celluloid, pyrolin, casein products, or any other suitable material—if of metal, aluminum would be preferred for lightness, though stainless steel facing disks would be preferred for the surfaces as it makes a clean readable surface for the required graduating and is easily etched.

If non-metallic material is used I prefer the material known as pyrolin, and which may have the graduations engraved or printed or photographed thereon.

However, with any material the construction is substantially the same, the inner and outer rings 1 and 2 are of the same thickness and preferably of solid material provided with an engaging tongue 4 projecting from either one of the members into a circumferential groove in the adjacent member.

To fit the members together I expand the outer member, and preferably shrink the inner member and with the aid of slight force spring them together, and to facilitate which the tongue is slightly rounded.

If the rings are of metal, heat will be employed in expanding the outer ring, but if of celluloid or pyrolin the outer ring is soaked in water or kept in moist air or steam until expanded sufficiently and/or the inner ring is contracted by drying out in a calcium chloride or sulfuric acid box.

In either case, the diameters of the rings and dimensions of tongue and groove are predetermined with such accuracy that when both rings are in place and have become of the same temperature or humidity the rings will slide nicely upon one another.

To insure proper lubrication of the joint I provide at one or more places a resiliently applied bar lubricant, preferably of the construction shown in Fig. 3 and wherein the outer ring is provided with a radial hole in which is freely slidable a small stick of graphite or similar lubricating compound 5 bearing at its end into the groove in the inner ring.

The stick of graphite is of a size to bear against the sides as well as against the bottom of the groove and is preferably secured to a small coiled spring 6 compressed by a small screw 7 closing the outer end of the hole in which the device is mounted, so that during operation of the slide rule the lubricating stick will be resiliently pressed against the frictional surfaces of the joint, and when desired the screw may be removed and the lubricator pulled out by pulling out the spring.

My runner comprises a pair of arms 3 preferably of transparent celluloid or the like each provided on their inner faces with a hair line 8 for aligning with the slide rule graduations not shown, and which arms are spaced at their outer ends by a block 9 and at their inner ends by a hub 10 so as to just clear the surfaces of the disk.

The inner ends of the runner arms are preferably bored and fitted over a circular boss on the hub 10 as indicated at 11 in Fig. 2 and against the outer sides of the inner ends of the arms are a pair of washers or disks 12 clamped together against the arms by means of screws 13. If the disks 12 are of celluloid I preferably provide a recessed nut for the screws as shown at 14.

Between hub 10 and the inner edge of disk 2 is an annular row of steel balls 15 seated in beveled in edge grooves formed respectively in the hub and ring. A separable flange 16 secured to one side of the inner ring 2 by means of screws 17 provides for insertion of the balls, and a few very thin paper shims position at 18 under the flange provide for adjustment until there is absolutely no play at all in any direction to the bearing though it permits revolution of the runner arms with utmost freedom and without any tendency to revolve the inner ring 2 with consequent displacement of any of its graduations with respect to outer ring 1 by which the device is usually held in the hands of an operator.

A modification of this bearing is shown in Fig. 4 wherein the hub portion is in two pieces designated 10'—10' separated by thin shims 18' all clamped by screws 13'. Another modification is shown in Fig. 5 wherein a plain hub 10'' is used, but in this latter case no adjustment for wear is provided.

At the outer end of the runner I provide a brake or clamp resiliently gripping the edge of the outer disk. In Figs. 1 and 2 the outer edge of the outer ring is channeled with a beveled edge groove as indicated at 19 and outwardly against which a pair of shoes 20, 20 are resiliently forced so as to normally frictionally lock the runner to the outer ring.

In the showing of Figs. 1 and 2 these shoes comprise spring metal plates 20 curved at their inner ends to follow the curved edge of the outer ring and beveled to fit against the beveled groove therein, and clamped at their outer ends between the arms 3 and spacing block 9 by means of rivets or screws as at 21.

To operate and release the brake plates 20 from engagement with the groove of the outer ring I provide a finger button 22 on each plate projecting outwardly in opposite directions so that by merely pinching the buttons together the runner is free to swing, and incidentally the pinched grip upon the buttons is an ideal hold on the runner for swinging its hair line over the graduations desired, and whereupon by simply releasing the buttons the runner is automatically clamped in place for the reading.

While it is intended that the spring plates 20 have a resilient outwardly directed force, this is augmented by making the buttons hollow and fitting therein a compression spring 23.

An optional clamp for the runner is shown in Fig. 6 wherein the outer ring 1' is grooved with a rectangular groove and a pair of spring metal plates 20' engage the straight sides of the groove.

In Figs. 7 and 8 a still further modification of the clamp shows a shoe 24 movable directly against a plain outer edge of outer ring 1'' and forced thereagainst by spring 25. The shoe is slotted at 26 and a Y-shaped spring plate 27 secured to one side of the runner and provided on its under side with a wedge-shaped jaw 28 bearing against the beveled outer end of the slot 26, releases the brake shoe when the plate 27 and opposite side of the runner are pinched between the thumb and finger of the runner operating hand, thus affording the same facility of operation as the devices previously described.

It is of course evident that while I show only two concentric rings for the mathematical graduations, any number of rings as may be desired for special instruments may be added by repeating the structure described.

It is also evident that laminated disks and other constructions may be used to obtain the tongue and groove joint between the inner and outer ring, instead of the shrinkage joint described, but the latter provides for solid inner and outer rings without the danger of buckling common to built-up thin structures, and besides is much simpler.

A hole or two in the hub as shown at 28 provides for detachably mounting the arm of a reading glass over the hair line if desired.

I claim:

1. In a circular disk type slide rule having a runner arm pivotally mounted to and for swinging around the rule disk, braking means on said arm resiliently gripping the edge of the ring and finger operated compressible means on said arm arranged and adapted for releasing said braking means, a groove in the peripheral edge of said ring in which said braking means is operative.

2. In a circular disk type slide rule having a runner arm pivotally mounted to and for swinging around the rule disk, braking means on said arm resiliently gripping the edge of the ring and finger operated compressible means on said arm arranged and adapted for releasing said braking means, a groove in the peripheral edge of said ring in which said braking means is operative, the sides of said groove being beveled and the braking means comprising opposed plates normally urged outwardly against the beveled sides of the groove.

3. In a circular disk type slide rule having a runner arm pivotally mounted to and for swinging around the rule disk, a groove in the edge of the disk, a plate secured to the runner projecting into the groove and means resiliently forcing it against the side thereof, a finger operable device projecting from the plate above the surface of the runner arranged and adapted for pressing on by the finger for releasing said plate from engagement with the edge of said groove.

JOHN R. DEMPSTER.